(12) United States Patent
Langenbeck (10) Patent No.: US 8,397,918 B2
(45) Date of Patent: Mar. 19, 2013

(54) MULTIPLE FLAT DISC TYPE PUMP AND HYDROCYCLONE

(76) Inventor: Keith A. Langenbeck, Roanoke, TX (US)

( * ) Notice: Subject to any disclaimer, the term of this patent is extended or adjusted under 35 U.S.C. 154(b) by 0 days.

(21) Appl. No.: 13/120,950

(22) PCT Filed: Sep. 26, 2009

(86) PCT No.: PCT/US2009/058508
§ 371 (c)(1), (2), (4) Date: Mar. 25, 2011

(87) PCT Pub. No.: WO2010/036984
PCT Pub. Date: Apr. 1, 2010

(65) Prior Publication Data
US 2011/0174697 A1 Jul. 21, 2011

Related U.S. Application Data

(60) Provisional application No. 61/194,609, filed on Sep. 28, 2008.

(51) Int. Cl.
*B03B 5/00* (2006.01)

(52) U.S. Cl. ............... 209/155; 209/17; 209/39; 209/44; 209/210

(58) Field of Classification Search .................. 209/155, 209/744, 751, 754, 755
See application file for complete search history.

(56) References Cited

U.S. PATENT DOCUMENTS

| | | | |
|---|---|---|---|
| 2,915,974 A * | 12/1959 | Enemark | ........................ 417/265 |
| 3,351,195 A * | 11/1967 | Hukki | .............................. 209/39 |
| 4,255,246 A | 3/1981 | Davis et al. | |
| 4,604,109 A * | 8/1986 | Koslow | ........................... 95/248 |
| 4,793,925 A | 12/1988 | Duvall et al. | |
| 4,872,959 A | 10/1989 | Herbst et al. | |
| 5,082,150 A | 1/1992 | Stenier et al. | |
| 5,110,471 A | 5/1992 | Kalnins | |
| 5,133,880 A * | 7/1992 | Lundquist et al. | ............ 210/774 |

(Continued)

FOREIGN PATENT DOCUMENTS

| WO | WO2010/036844 A | 4/2010 |
|---|---|---|
| WO | WO2010/036984 A | 4/2010 |

(Continued)

OTHER PUBLICATIONS

Advance E-mail PCT Notification Concerning Transmittal of International Preliminary Report on Patentability with Written Opinion for PCT/US2009/058508 (related to present application) publication date Apr. 7, 2011, Langenbeck, Keith A.

(Continued)

*Primary Examiner* — Terrell Matthews
(74) *Attorney, Agent, or Firm* — Roeder & Broder LLP (57) ABSTRACT

A separator for separating a first component and a second component from within a mixed fluid includes a plurality of discs, a separator chamber, and a disc rotator. The discs are spaced apart along a disc axis The separator chamber encircles the plurality of discs. The disc rotator rotates the plurality of discs about the disc axis relative to the separator chamber. The separator chamber includes a chamber inlet that receives the mixed fluid, a first outlet, and a second outlet. The disc rotator rotates the plurality of discs about the disc axis so that the mixed fluid is spun around the separator chamber about the disc axis to separate the heavier second component from the first component. The first component is directed out of the separator through the first outlet and the second component is directed out of separator through the second outlet.

15 Claims, 6 Drawing Sheets

U.S. PATENT DOCUMENTS

| | | | |
|---|---|---|---|
| 5,180,493 | A | 1/1993 | Grieve |
| 5,240,115 | A | 8/1993 | Crossley et al. |
| 5,266,198 | A | 11/1993 | Vikio |
| 5,284,250 | A * | 2/1994 | Stepenhoff ............ 209/210 |
| 5,587,057 | A | 12/1996 | Metzler et al. |
| 5,894,935 | A * | 4/1999 | Stein ..................... 209/210 |
| 5,984,213 | A * | 11/1999 | Woodall et al. ............ 241/21 |
| 6,238,546 | B1 | 5/2001 | Knieper et al. |
| 6,267,885 | B1 | 7/2001 | Briggs et al. |
| 6,358,398 | B1 | 3/2002 | Halldorson et al. |
| 6,488,835 | B1 | 12/2002 | Powell |
| 6,613,202 | B2 | 9/2003 | Herbst et al. |
| 6,613,217 | B1 | 9/2003 | Gilmore |
| 6,663,783 | B2 | 12/2003 | Stephenson et al. |
| 6,780,292 | B2 | 8/2004 | Hermann et al. |
| 6,811,713 | B2 * | 11/2004 | Arnaud ................. 210/788 |
| 6,814,840 | B2 | 11/2004 | Henuset et al. |
| 7,029,586 | B2 | 4/2006 | Austin et al. |
| 7,255,793 | B2 * | 8/2007 | Cort ..................... 210/695 |
| 7,468,136 | B2 * | 12/2008 | Bache .................... 210/703 |
| 2005/0224338 | A1 | 10/2005 | Kin et al. |
| 2006/0151337 | A1 | 7/2006 | Gilmore |
| 2006/0163153 | A1 | 7/2006 | Caldelman |
| 2006/0186038 | A1 | 8/2006 | Nassif |
| 2007/0199868 | A1 | 8/2007 | Volpe |
| 2009/0008269 | A1 | 1/2009 | Heiss |

FOREIGN PATENT DOCUMENTS

WO    WO2010/068801 A    6/2010

OTHER PUBLICATIONS

PCT International Search Report and Written Opinion for PCT/US2009/058508 (related to present application) dated Dec. 23, 2009, Langenbeck, Keith A.

* cited by examiner

MULTIPLE FLAT DISC TYPE PUMP AND HYDROCYCLONE

RELATED APPLICATION

This application claims priority on U.S. Provisional Application Ser. No. 61/194,609 filed on Sep. 28, 2008 and entitled "Multiple Flat Disc Type Pump and Hydrocyclone". As far as is permitted, the contents of U.S. Provisional Application Ser. No. 61/194,609 are incorporated herein by reference.

BACKGROUND

A hydrocyclone is a device that applies centrifugal force to a mixed fluid to create controlled vortex flow patterns in order to classify, separate or sort particles in the mixed fluid based on the sizes or densities of the particles. Additionally, a hydrocyclone may be used to separate solids from liquids or to separate liquids of different density or viscosity.

A hydrocyclone will normally have a cylindrically shaped primary housing at the top where the mixed fluid is being fed tangentially, and a conical base. With the controlled vortex flow patterns, heavy components move outward toward the wall of the cylinder where they agglomerate and spiral down the wall to an outlet at the bottom of the conical base. Conversely, light components move toward the axis of the hydrocyclone where they move up toward an outlet at the top of the device. Generally, hydrocyclones are used in continuous flow systems so that the instantaneous liquid inflow to the hydrocyclone is equal to the total instantaneous outflow of the light components plus the heavy components.

Existing hydrocyclones are passive devices, e.g. simply introducing the mixed fluid tangentially to the cylindrical section generates the circular and then the vortex flow patterns. Unfortunately, in these existing hydrocyclones, the mixed fluid being fed into the primary housing must be within certain parameters of fluid pressure and flow velocity. For example, if either the flow rate or pressure is below certain lower limits, the initial circular flow fluid in the primary housing is not generated and the fluid in effect slides down the conical base and out of the outlet at the bottom of the conical base without separating the different weight components. Additionally, if either the flow rate or pressure is above certain upper limits, the entering fluid immediately becomes chaotic and the circular pattern in the primary housing is never established and the different weight components can not be separated efficiently and effectively. Therefore, in these existing hydrocyclones, the operating range of fluid pressure and velocity has to be met and maintained in order for the vortex pattern to be created and operate.

SUMMARY

The present invention is directed to a novel mechanical design for a multi-plate flat disc type separator of a separator assembly 10 that is uniquely designed to actively generate a highly stable, non-turbulent circular flow pattern and subsequently a controlled vortex flow pattern of a mixed fluid that enables components to be separated from within the mixed fluid based on the size, density, weight, or viscosity of the components. The controlled vortex flow patterns are used to induce centrifugal separation of the components in the fluid being moved or processed. The centrifugal forces at work in this vortex flow pattern have the effect of inducing: (1) the less dense or less viscous fluids in a mix of different density or viscosity fluids to separate with the less dense or viscous fluids flowing up and out of the hydrocyclone, (2) the smaller particles in a slurry of mixed particle size but similar particle densities to flow up and out of the hydrocyclone, (3) the lighter density particles in a slurry of different density particles but similar particle size to flow up and out of the hydrocyclone, and/or (4) a differential or gradient of dissolved mineral concentration with the lower dissolved concentration to flow up and out of the hydrocyclone.

In particular, the present invention is directed to a separator for separating a first component and a second component that is heavier than the first component from within a mixed fluid. In certain embodiments, the separator comprises a plurality of discs that are spaced apart along a disc axis, a separator chamber that encircles the plurality of discs, and a disc rotator that rotates the plurality of discs about the disc axis relative to the separator chamber. In some embodiments, the separator chamber can include a chamber inlet that receives the mixed fluid, a first outlet and a second outlet. In such embodiments, the disc rotator rotates the plurality of discs about the disc axis so that the mixed fluid entering the separator chamber is spun around the stationary separator chamber about the disc axis to begin the process of separating the heavier second component from the first component. Additionally, the separation of the first component and the second component results in the first component being directed out of the separator through the first outlet and the second component being directed out of the separator through the second outlet.

In some embodiments, at least one of the discs includes a disc aperture that is located on the disc axis. In such embodiments, the chamber inlet can be positioned so that at least a portion of the mixed fluid flows through the disc aperture. Additionally, in some such embodiments, at least a portion of the mixed fluid flows between the discs and across the surface of the discs.

Further, in one embodiment, the separator chamber includes a circular tube shaped disc region that encircles the plurality of discs and a tapered tube shaped outlet region that is positioned below the disc region. In such embodiment, the second outlet is positioned near an outer perimeter, or bottom, of the outlet region and away from the disc region. Additionally, in one embodiment, the separator chamber can further include an inlet region, wherein the mixed fluid is directed into the inlet region through the chamber inlet. In such embodiment, the mixed fluid flows from the inlet region to the disc region through a chamber aperture.

In certain embodiments, the separator further includes a shaft that is coupled to the discs and the disc rotator so that rotation of the shaft with the disc rotator results in rotation of the discs. In some such embodiments, the chamber aperture substantially surrounds the shaft, and the mixed fluid flows through the chamber aperture along the outer surface of the shaft. Additionally, in one embodiment, the inlet region further includes an intermediate floor that is tapered from an outside diameter down and toward the chamber aperture.

In some embodiments, the separator further comprises a shaft that is coupled to the discs and the disc rotator. In such embodiments, rotation of the shaft with the disc rotator results in rotation of the discs. Additionally, the shaft can extend along the disc axis. Moreover, the shaft can include a shaft aperture that defines the first outlet. The shaft aperture can further extend along the disc axis into a center of the outlet region.

Additionally, the present invention is directed to a separator assembly including a separator and a feed pump that supplies the mixed fluid to the separator.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
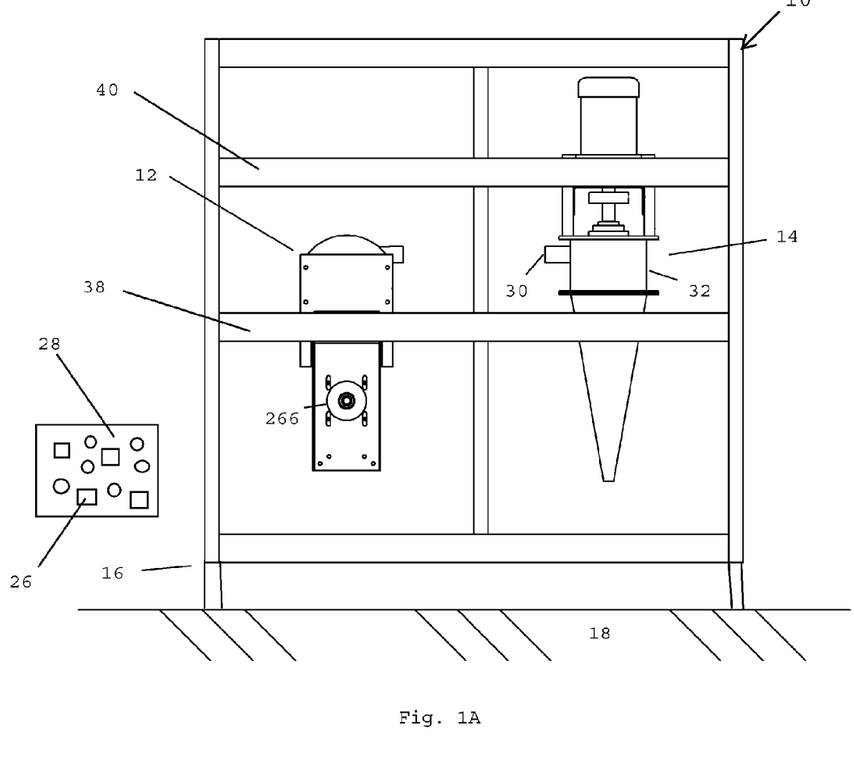
FIG. 1A is a side view of an embodiment of a separator assembly having features of the present invention.
Figure 1B:
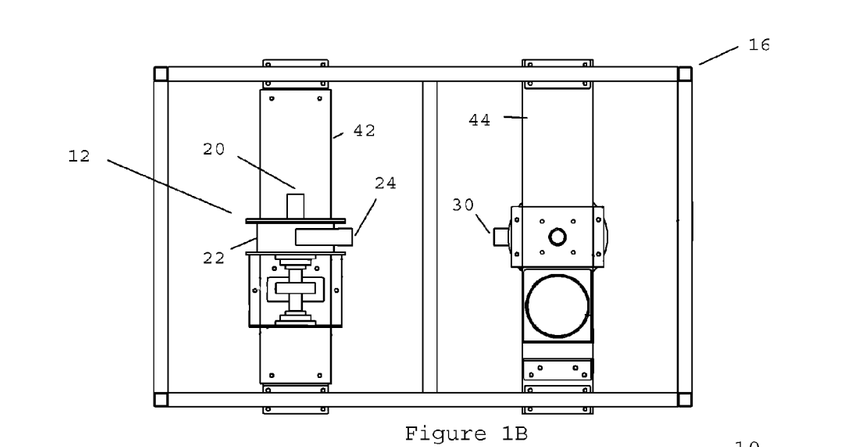
FIG. 1B is a top view of the separator assembly illustrated in FIG. 1A.

FIG. 1A is a side view of an embodiment of a separator assembly 10 having features of the present invention. FIG. 1B is a top view of the separator assembly 10 illustrated in FIG. 1A. As illustrated, the separator assembly 10 includes a feed pump 12 and a separator 14. Because the separator 14 as illustrated and described herein utilizes a plurality of rotating discs, the separator 14 may also be referred to as a "hydrocyclone" or a "fractioning centrifuge". In certain alternative embodiments, the separator assembly 10 can include a plurality of separators 14 that are positioned in a single series or multiple series in what is commonly referred to as a "hydrocyclone cascade".

In the embodiment illustrated in FIGS. 1A and 1B, the feed pump 12 and the separator 14 are mounted within a frame 16 that supports and maintains the feed pump 12 and the separator 14 above a surface 18, such as a floor or the ground.

In this embodiment, the feed pump 12 includes a pump inlet 20, a pump housing 22 and a pump outlet 24. The feed pump 12 is adapted to receive a mixed fluid 26 (illustrated with circles and squares) from a fluid source 28 into the pump housing 22 through the pump inlet 20. In different embodiments, the mixed fluid 26 can include a slurry of similar density but different size particles, a slurry of different density but similar size particles, a mix of different viscosity liquids, and/or a fluid in which certain minerals have been dissolved.

As an overview, in certain embodiments, the separator assembly 10 is uniquely designed to actively generate a highly stable, non-turbulent circular flow pattern and subsequently a controlled vortex flow pattern of a mixed fluid 26 that enables components to be separated from within the mixed fluid based on the size, density, weight, or viscosity of the components. More specifically, the specific design of the separator 14 enables the separator assembly 10 to effectively separate components from within the mixed fluid 26 based on the size, density, weight, viscosity of the components, or dissolved mineral concentrations. For example, the separator 14 can effectively separate heavier components (e.g., those of greater size, greater density, greater viscosity, or greater dissolved mineral concentration) from lighter components (e.g., those of lesser size, lesser density, lesser viscosity, or lesser dissolved mineral concentration) within the mixed fluid 26. Additionally, the separator assembly 10 is able to effectively separate the heavier components from the lighter components within the mixed fluid 26 with little or no concern pertaining to the inlet flow pressure and the inlet flow velocity of the mixed fluid 26. Moreover, in embodiments wherein the separator assembly 10 includes more than one separator 14, the separator assembly 10 provides an even greater separation of the heavier components from the lighter components as the mixed fluid 26 passes through each separator 14.

In this embodiment, the pump inlet 20 receives the mixed fluid 26 from the fluid source 28 and directs the mixed fluid 26 substantially into the center and along the centerline of the pump housing 22 and below the pump outlet 24. After the mixed fluid 26 is moved through the feed pump 12, as will be discussed in detail below, the mixed fluid 26 is subsequently directed out of the feed pump 12 through the pump outlet 24 and toward the separator 14. The direction of the mixed fluid 26 leaving the feed pump 12 through the pump outlet 24 is approximately at a right angle relative to the direction of the mixed fluid 26 as it enters the pump inlet 20. Additionally, the pump outlet 24 is positioned such that it is essentially tangential to the pump housing 22.

As illustrated in FIGS. 1A and 1B, the separator 14 includes a separator inlet 30 (also referred to herein as a chamber inlet) and a separator chamber 32. The separator 14 is adapted to receive the mixed fluid 26 from the pump outlet 24 and into the separator chamber 32 through the separator inlet 30. In some embodiments, the elevation from the surface 18 to the center of the pump outlet 24 is approximately the same as the elevation from the surface 18 to the center of the separator inlet 30. Additionally, the separator inlet 30 can be positioned substantially perpendicular to the separator chamber 32.

The mixed fluid 26 is subsequently moved through the separator 14, as will be discussed in detail below, and the separator 14 separates one or more first components 34 (illustrated with circles) and one or more second components 36 (illustrated with squares) from within the mixed fluid 26. In some embodiments, the second components 36 are heavier than the first components 34. It should be noted, however, that the use of the terms first component and second component is merely for ease of description, and either the heavier components or the lighter components can be referred to as the first components and the second components.

As noted above, the frame 16 supports the feed pump 12 and the separator 14 above the surface 18. In some embodiments, the frame 16 can be a welded frame that is comprised square and rectangular metal tubing. Alternatively, the frame 16 can be made from other substantially sturdy and rigid materials that can effectively support the weight of the feed pump 12 and the separator 14. Still alternatively, the frame 16 can be formed from multiple parts that are welded or otherwise secured together, or the frame 16 can be formed as a unitary structure.

In this embodiment, the frame 16 includes a first cross member 38 that is used to locate and attach the feed pump 12 to the frame 16, and a second cross member 40 that is used to locate and attach the separator 14 to the frame 16. In particular, the feed pump 12 is mounted on a pump mounting beam 42 that is secured to the first cross member 38 on opposite sides of the frame 16. Somewhat similarly, the separator 14 is mounted on a separator mounting beam 44 that is secured to the second cross member 40 on opposite sides of the frame 16, such that the separator mounting beam 44 is positioned substantially parallel to the pump mounting beam 42.

As illustrated, due to the greater vertical size of the separator 14 versus the feed pump 12, the second cross member 40 is positioned somewhat higher on the frame 16 than the first cross member 38. This enables the feed pump 12 and the separator 14 to be maintained spaced apart from the surface 18 with the pump outlet 24 and the separator inlet 30 at approximately the same elevation.

Figure 2A:
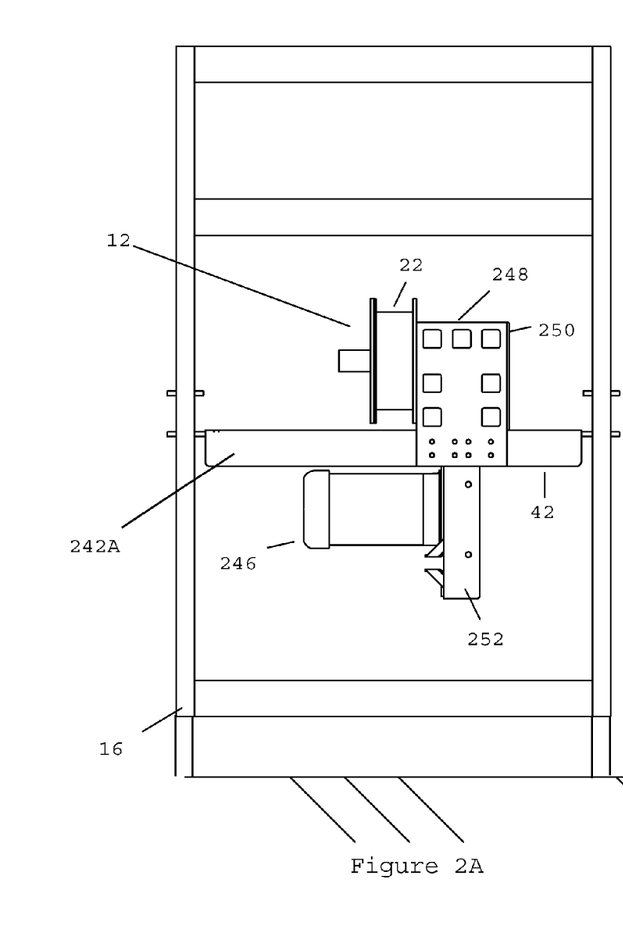
FIG. 2A is an end view of the feed pump illustrated in FIG. 1A.

FIG. 2A is an end view of the feed pump 12 illustrated in FIG. 1A. The design of the feed pump 12 can be varied to suit the specific requirements of the separator assembly 10 (illustrated in FIG. 1A). In particular, FIG. 2A illustrates that the feed pump 12 includes the pump housing 22 and a pump motor 246 that are coupled to the pump mounting beam 42. The feed pump 12 that is illustrated and described herein is a rotating disc type feed pump. Alternatively, the feed pump 12 can be a different type of feed pump that supplies the mixed fluid 26 (illustrated in FIG. 1A) to the separator 14 (illustrated in FIG. 1A).

As illustrated, the feed pump 12 is suspended from and within the frame 16 via the pump mounting beam 42. In this embodiment, the pump mounting beam 42 includes a pair of flanges 242A (only one of which is illustrated) that extend in a generally downward direction from the remainder of the pump mounting beam 42. Mounted to the outside of each flange 242A of the pump mounting beam 42 is a machined pump mounting block 248 that can be attached with conventional screw type fasteners to the flanges 242A of the pump mounting beam 42. Alternatively, the pump mounting blocks 248 can be attached to the flanges 242A of the pump mounting beam 42 by another method.

The pump housing 22 is coupled to the pump mounting beam 42 via the pump mounting blocks 248. In particular, the pump housing 22 is attached to a first end of each of the pump mounting blocks 248. In some embodiments, the pump housing 22 can be attached to the first end of each of the pump mounting blocks 248 with conventional screw type fasteners. Alternatively, the pump housing 22 can be attached to the first end of each of the mounting blocks 248 by another method. An end plate 250 is attached to a second end of each of the pump mounting blocks 248. In some embodiments, the end plate 250 can be attached to the second end of each of the pump mounting blocks 248 with conventional screw type fasteners. Alternatively, the end plate 250 can be attached to the second end of each of the mounting blocks 248 by another method.

The pump motor 246 is adapted to operate certain elements of the feed pump 12. As illustrated, the pump motor 246 is coupled to the pump mounting beam 42 via a motor mounting frame 252. The motor mounting frame 252 is attached to the inside of both flanges 242A of the pump mounting beam 42, and is positioned substantially immediately below the pump mounting beam 42. The pump motor 246 is mounted to and extends substantially perpendicularly away from the motor mounting frame 252. In some embodiments, the pump motor 246 can be positioned relative to the pump housing 22 such that a centerline of the pump motor 246 is vertically aligned with the centerline of the pump housing 22.

Figures 2B, 2C:
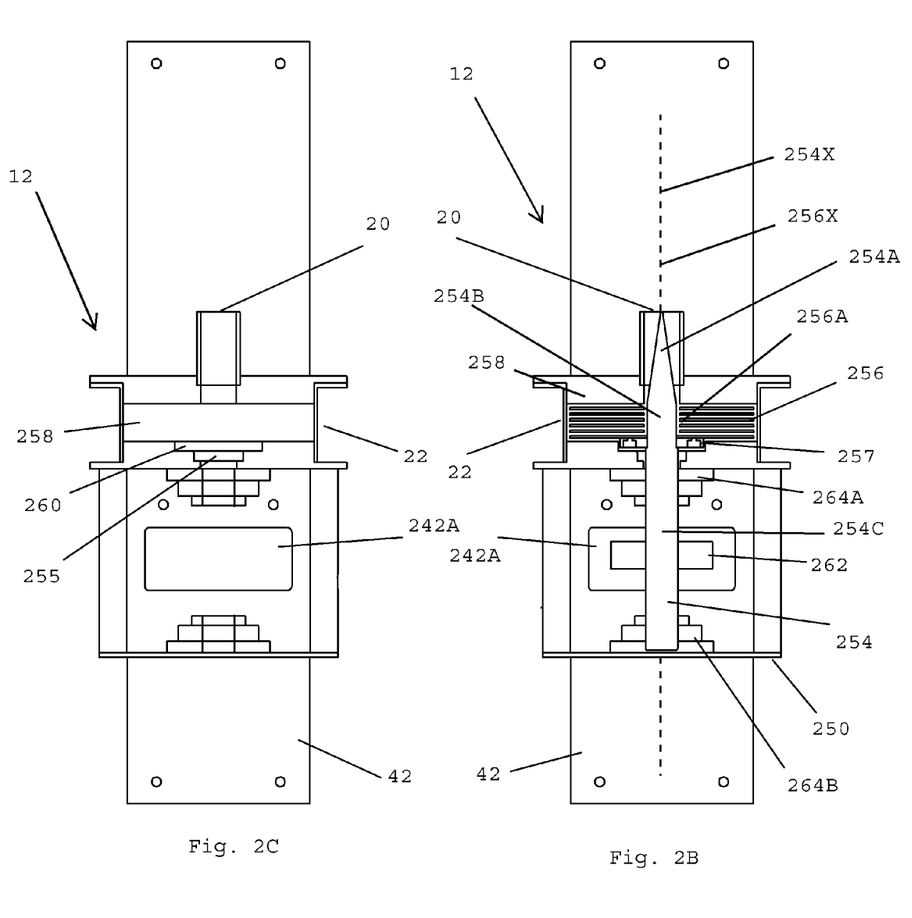
FIG. 2B is a top section view of the feed pump illustrated in FIG. 2A.
FIG. 2C is a top section view of the feed pump illustrated in FIG. 2A with the pump shaft, the pump disc mounting ring and the pump discs having been removed.

FIG. 2B is a top section view of the feed pump 12 illustrated in FIG. 2A. In particular, FIG. 2B illustrates that the feed pump 12 includes the pump inlet 20, the pump housing 22, a pump shaft 254, a pump seal 255 (illustrated in FIG. 2C) that seals the pump shaft 254 to the pump housing 22, a plurality of pump discs 256 each having a pump disc aperture 256A, and a pump disc mounting ring 257 for securing the pump discs 256 to the pump shaft 254. As provided above, the mixed fluid 26 (illustrated in FIG. 1A) is received into the pump housing 22 through the pump inlet 20.

The pump housing 22 is positioned adjacent to the pump inlet 20. The design of the pump housing 22 can be varied to suit the specific requirements of the feed pump 12 and the separator assembly 10. In this embodiment, the pump housing 22 includes a main pump cavity 258 and a pump sub-cavity 260 (illustrated in FIG. 2C).

As illustrated, the main pump cavity 258 can be substantially cylindrically shaped and is adapted to receive the plurality of pump discs 256, and at least a portion of the pump shaft 254. The internal diameter of the main pump cavity 258 is slightly larger than the diameter of the pump discs 256 so as to allow the pump discs 256 to rotate within the main pump cavity 258. In certain alternative embodiments, the main pump cavity 258 can be other than substantially cylindrically shaped.

In this embodiment, the pump shaft 254 has a substantially circular cross-section and extends along a pump shaft axis 254X. The design of the pump shaft 254 can be varied to suit the specific requirements of the feed pump 12 and the separator assembly 10 (illustrated in FIG. 1A). As illustrated, the pump shaft 254 includes a front section 254A, a middle section 254B, and a back section 254C.

As illustrated, the front section 254A of the pump shaft 254 has a substantially cone-shaped or tapered design and is positioned substantially within the pump inlet 20. The front section 254A is substantially pointed nearest to the entrance to the pump inlet 20 and functions to direct the mixed fluid 26 into the pump housing 22 along the outside of the pump shaft 254. The front section 254A gradually tapers outward as it moves away from the entrance to the pump inlet 20 and extends into the pump housing 22 to the main pump cavity 258.

The middle section 254B of the pump shaft 254 is substantially cylinder shaped, including a secondary diameter 254BD (illustrated in FIG. 2D), and extends substantially through the pump housing 22. In particular, the middle section 254B extends through the main pump cavity 258 and the pump sub-cavity 260 of the pump housing 22. Additionally, the middle section 254B extends through the pump disc aperture 256A of each of the pump discs 256. The secondary diameter 254BD of the middle section 254B is slightly smaller than the diameter of the pump disc aperture 256A in each of the pump discs 256 so as to allow a portion of the mixed fluid 26 to travel along the pump shaft 254 through the disc aperture 256A.

The back section 254C of the pump shaft 254 is substantially cylinder shaped, including a primary diameter 254CD (illustrated in FIG. 2D), and commences immediately after the pump sub-cavity 260 and extends away from the pump housing 22. As illustrated in this embodiment, the primary diameter 254CD of the back section 254C can be slightly larger than the secondary diameter 254BD of the middle section 254B. Alternatively, the primary diameter 254CD of the back section 254C can have a different size relationship in comparison to the secondary diameter 254BD of the middle section 254B.

The pump shaft 254 further includes a driven sprocket 262 that is secured to the back section 254C of the pump shaft 254, and a pair of bearings 264A, 264B that allow the pump shaft 254, and thus the pump discs 256, to rotate relative to the pump housing 22.

The driven sprocket 262 is positioned along the pump shaft 254 such that the chain or belt coupled to the driven sprocket 262 passes through a beam aperture 242A within the pump mounting beam 42. The driven sprocket 262 is engaged by a drive sprocket 266 (illustrated in FIG. 1A) that is attached to an output shaft of the pump motor 246 (illustrated in FIG. 2A). The drive sprocket 266 is coupled to the driven sprocket 262 via a chain or belt (not illustrated) such that rotation of the drive sprocket 266 results in rotation of the driven sprocket 262. Accordingly, rotation of the output shaft of the pump motor 246 rotates the drive sprocket 266, which rotates the driven sprocket 262, and which, in turn, causes the pump shaft 254 and the pump discs 256 to rotate relative to the pump housing 22. Stated another way, the pump shaft 254 is coupled to the pump discs 256 and the pump motor 246 so that rotation of the pump shaft 254 with the pump motor 246 results in rotation of the pump discs 256.

A first bearing 264A is attached to the back of the pump housing 22 and a second bearing 264A is attached to the inside of the end plate 250. The first bearing 264A and the second bearing 264B cooperate to allow the pump shaft 254, and thus the pump discs 256, to rotate relative to the pump housing 22.

The pump discs 256 are positioned substantially uniformly spaced apart from each other along a pump disc axis 256X and are coupled to the pump shaft 254 via the pump disc mounting ring 257. More particularly, the pump discs 256 are physically attached to the pump disc mounting ring 257, which is circular in shape and has been press or shrunk fit over the secondary diameter 254BD of the middle section 254B of the pump shaft 254. In certain embodiments, the pump disc axis 256X substantially coincides with the pump shaft axis 254X. As illustrated, the pump discs 256 can each be substantially circle shaped and can each include the pump disc aperture 256A. The pump disc aperture 256A of each of the pump discs 256 is slightly larger than secondary diameter 254BD of the middle section 254B of the pump shaft 254.

As the mixed fluid 26 flows into the pump housing 22 along the outside of the pump shaft 254, the mixed fluid 26 passes along the inner diameter of one or more of the pump disc apertures 256A and is forced out to the edge of the main pump cavity 258 between the pump discs 256. The fluid friction or molecular adhesion of the mixed fluid 26 to the high speed rotating pump discs 256 is the means for drawing the mixed fluid into and moving the mixed fluid out of the feed pump 12.

During operation of the feed pump 12, the flow of the mixed fluid 26 proceeds as follows: (i) the mixed fluid 26 flows into the feed pump 12 through the pump inlet 20, (ii) the mixed fluid 26 flows down the outside of the tapered front section 254A of the pump shaft 254, (iii) the mixed fluid 26 flows along the outside of the secondary diameter 254BD of the middle section 254B of the pump shaft 254, (iv) the mixed fluid 26 flows out from the pump shaft 254 between the spacing that separates the pump discs 256, (v) the mixed fluid 26 flows along the interior walls of the pump main cavity 258 and (vi) the mixed fluid 26 flows out of the pump housing 22 through the tangential pump outlet 24 (illustrated in FIG. 1A).

FIG. 2C is a top section view of the feed pump 12 illustrated in FIG. 2A with the pump shaft 254, the pump disc mounting ring 257 and the pump discs 256 having been removed. In particular, FIG. 2C illustrates the pump inlet 20, the pump housing 20, the beam aperture 242A that extends through the pump mounting beam 42, and the pump seal 255.

As noted above, in this embodiment, the pump housing 20 includes the main pump cavity 258 and the pump sub-cavity 260. The main pump cavity 258 substantially surrounds the pump discs 256. The pump sub-cavity 260 is positioned adjacent to the main pump cavity 258 and is adapted to receive and substantially surround the pump disc mounting ring 257. The pump sub-cavity 260 has an internal diameter that is smaller than the internal diameter of the main pump cavity 258.

The pump seal 255 is adapted for sealing the pump shaft 254 to the pump housing 22. In particular, the pump seal 255 is positioned substantially adjacent to the pump sub-cavity 260 and is adapted to seal the pump shaft 254 to the pump housing 22 so that the mixed fluid 26 can not leave the pump housing 22 along the pump shaft 254. More specifically, the pump seal 255 seals the pump shaft 254 to the pump housing 22 so that the mixed fluid 26 is only directed out of the pump housing 22 through the pump outlet 24 (illustrated in FIG. 1A).

Figure 2D:
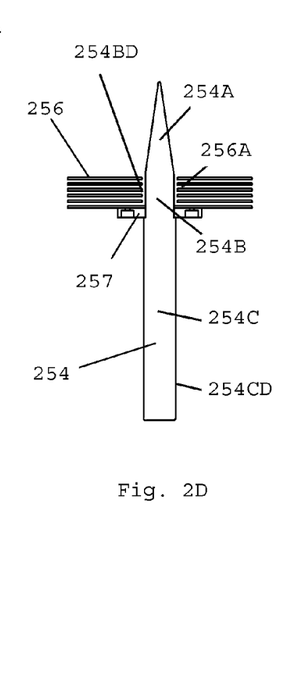
FIG. 2D is a top section view of the pump shaft, the pump disc mounting ring and the pump discs of the feed pump illustrated in FIG. 2A.

FIG. 2D is a top section view of the pump shaft 254, the pump disc mounting ring 257 and the pump discs 256 of the feed pump 12 illustrated in FIG. 2A.

As discussed above, the pump shaft 254 includes the front section 254A, the middle section 254B including the secondary diameter 254BD, and the back section 254C including the primary diameter 254CD. The middle section 254B is substantially surrounded by the pump discs 256 and the pump mounting ring 257. The back section 254C commences immediately after the pump disc mounting ring 257.

In this embodiment, the feed pump 12 is illustrated as having six pump discs 256 that are coupled to the pump shaft 254 via the pump disc mounting ring 257. Alternatively, the feed pump 12 can be designed to have fewer than six or greater than six pump discs 256 that are coupled to the pump shaft 254.

Figure 3A:
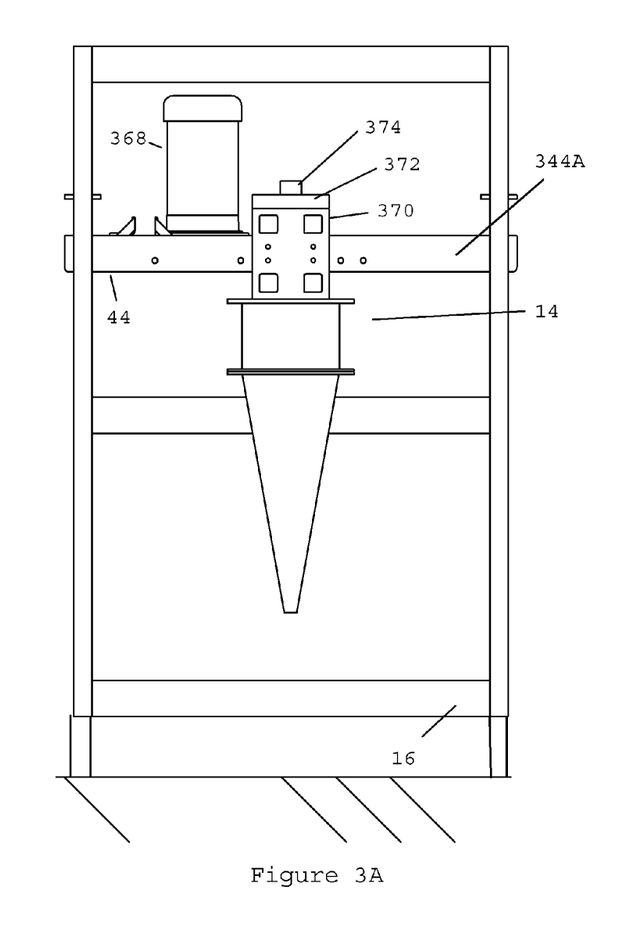
FIG. 3A is an end view of the separator illustrated in FIG. 1A.

FIG. 3A is an end view of the separator 14 illustrated in FIG. 1A. The design of the separator 14 can be varied to suit the specific requirements of the separator assembly 10 (illustrated in FIG. 1A). In particular, FIG. 3A illustrates that the separator 14 includes the separator chamber 32 and a separator motor 368 (also referred to herein as a disc rotator) that are coupled to the separator mounting beam 44.

As illustrated, the separator 14 is suspended from and within the frame 16 via the separator mounting beam 44. In this embodiment, the separator mounting beam 44 includes a pair of flanges 344A (only one of which is illustrated) that extend in a generally downward direction from the remainder of the separator mounting beam 44. Mounted to the outside of each flange 344A of the separator mounting beam 44 is a machined separator mounting block 370 that can be attached with conventional screw type fasteners to the flanges 344 of the separator mounting beam 44. Alternatively, the separator mounting blocks 370 can be attached to the flanges 344A of the separator mounting beam 44 by another method.

The separator chamber 32 is coupled to the separator mounting beam 44 via the separator mounting blocks 370. In particular, the separator chamber 32 is attached to a lower end of each of the separator mounting blocks 370. In some embodiments, the separator chamber 32 can be attached to the lower end of each of the separator mounting blocks 370 with conventional screw type fasteners. Alternatively, the separator chamber 32 can be attached to the lower end of each of the separator mounting blocks 370 by another method. A top plate 372 is attached to an upper end of each of the separator mounting blocks 370. In some embodiments, the top plate 372 can be attached to the upper end of each of the separator mounting blocks 370 with conventional screw type fasteners. Alternatively, the top plate 372 can be attached to the upper end of each of the mounting blocks 370 by another method. Additionally, mounted on top of and welded to the top plate 372 is an upper fluid outlet coupling 374.

The disc rotator 368 is adapted to operate certain elements of the separator 14. As illustrated, the disc rotator 368 is secured to the upper surface of the separator mounting beam 44. The disc rotator 368 has its output shaft pointing down and penetrating through the horizontal web of the separator mounting beam 44. The centerline of the disc rotator 368 and the centerline of the separator chamber 32 are both aligned and coincident with the major axis of the separator mounting beam 44.

Figures 3B, 3D:
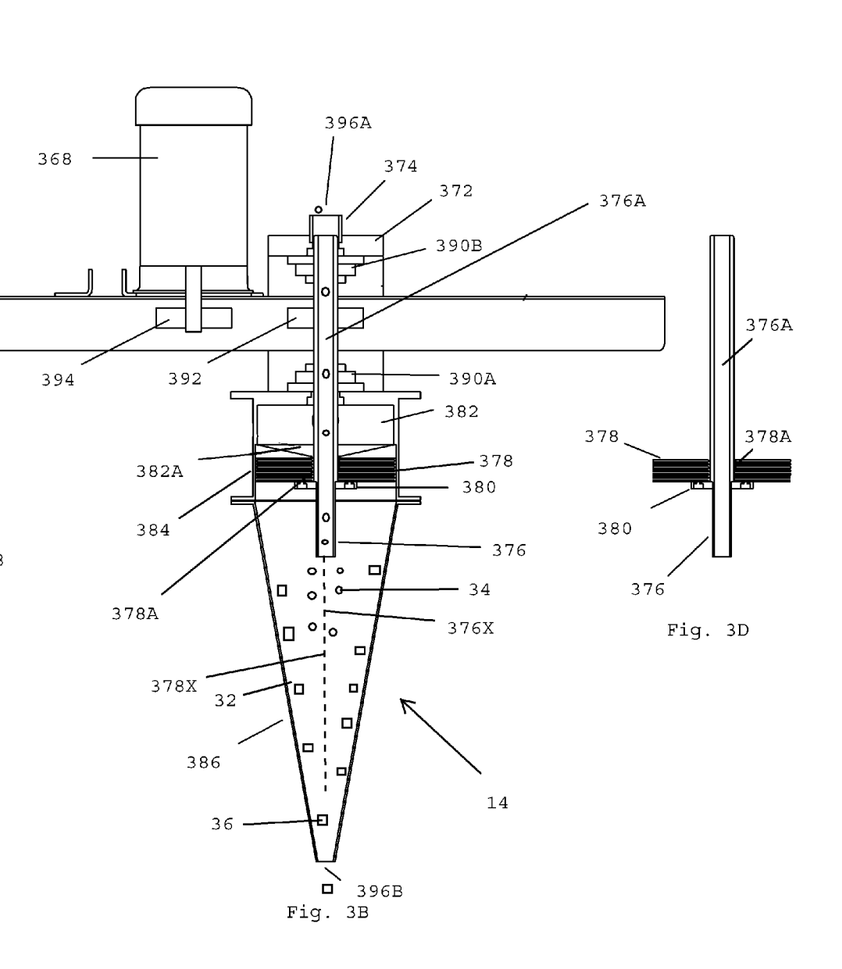
FIG. 3B is an end section view of the separator illustrated in FIG. 3A.
FIG. 3D is an end section view of the separator shaft, the separator disc mounting ring and the separator discs of the separator illustrated in FIG. 3A.

FIG. 3B is an end section view of the separator 14 illustrated in FIG. 3A. In particular, FIG. 3B illustrates that the separator 14 includes the separator chamber 32, the disc rotator 368, a separator shaft 376 (also sometimes referred to herein as the shaft), a pair of separator seals 377A, 377B (illustrated in FIG. 3C) that seal the separator shaft 376 to the separator chamber 32 and to the top plate 372, a plurality of separator discs 378 (also sometimes referred to herein as the discs) that are coupled to the separator shaft 376, and a separator disc mounting ring 380.

The separator chamber 32 substantially encircles the plurality of separator discs 378. The design of the separator chamber 32 can be varied to suit the specific requirements of the separator chamber 32 and the separator assembly 10 (illustrated in FIG. 1A). As illustrated in this embodiment, the separator chamber 32 includes an inlet region 382, a disc region 384, and an outlet region 386.

Figure 3C:
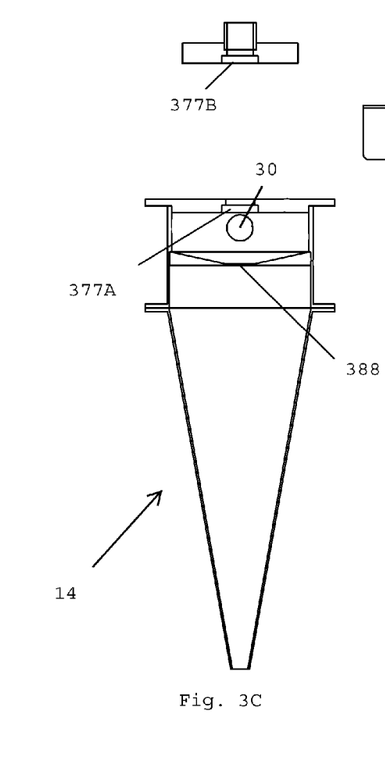
FIG. 3C is an end section view of the separator illustrated in FIG. 3A with the separator shaft, the separator disc mounting ring, the separator discs, the bearings and the mounting block having been removed.

The inlet region 382 of the separator chamber 32 is substantially circular tube shaped and is adapted to receive the mixed fluid 26 (illustrated in FIG. 1A) through the separator inlet 30 (illustrated in FIGS. 1A and 3C). The inlet region 382 has a circular intermediate floor 382A that is affixed to the interior of the separator chamber 32. The intermediate floor 382A has a slight taper from an outside diameter down and toward a chamber aperture 388 that is substantially centrally located along the intermediate floor 382A. The chamber aperture 388 is substantially circle shaped and is adapted to receive the separator shaft 376. The chamber aperture 388 has a diameter that is somewhat greater than the outside diameter of the separator shaft 376 so as to allow the mixed fluid 26 to flow through the chamber aperture 388 along the outside diameter or outer surface of the separator shaft 376. Stated another way, the mixed fluid 26 flows into the inlet region 382 of the separator chamber 32 through the separator inlet 30, moves down the tapered portion of the intermediate floor 382A, and subsequently moves down the outside diameter of the separator shaft 376 between the inside diameter of the chamber aperture 388 and the outside diameter of the separator shaft 376.

The disc region 384 of the separator chamber 32 is positioned substantially beneath the intermediate floor 382A of the inlet region 382. The disc region 384 is substantially circular tube shaped and is adapted to receive the mixed fluid 26 that passes through the chamber aperture 388 along the exterior diameter of the separator shaft 376 and out from between the discs 378. Additionally, the disc region 384 encircles the plurality of separator discs 378.

The outlet region 386 of the separator chamber 32 is positioned below the disc region 384. The outlet region 386 has a tapered tube shape and is adapted to receive the mixed fluid 26 that passes through the disc region 384. In some embodiments, the outlet region 386 is attached to the bottom of the disc region 384 with a plurality of conventional screw type fasteners. Alternatively, the outlet region 386 can be attached to the bottom of the disc region 384 by another method.

The separator shaft 376 extends along a shaft axis 376X through the inlet region 382 and the disc region 384 of the separator chamber 32 and down into the outlet region 386 of the separator chamber 32. Additionally, the separator shaft 376 extends in a generally upward direction out of the separator chamber 32. The separator shaft 376 is suspended for rotating between a pair of bearings 390A, 390B that cooperate to enable the separator shaft 376 to rotate relative to the separator chamber 32. The first bearing 390A is attached to the top of the separator chamber 32 and the second bearing 390B is attached to the underside of the top plate 372.

Additionally, affixed to the exterior of the separator shaft 376 is a driven sprocket 392. The driven sprocket 392 is adapted to be engaged by a drive sprocket 394 that is attached to the output shaft of the disc rotator 368 and which passes between the two flanges 344A of the separator mounting beam 42. The drive sprocket 394 is coupled to the driven sprocket 392 via a chain or belt (not illustrated) such that rotation of the drive sprocket 394 results in rotation of the driven sprocket 392. Accordingly, rotation of the output shaft of the disc rotator 368 rotates the drive sprocket 394, which rotates the driven sprocket 392, and which, in turn, causes the separator shaft 376 and the separator discs 378 to rotate relative to the separator chamber 32. Stated another way, the separator shaft 376 is coupled to the separator discs 378 and the disc rotator 368 so that rotation of the separator shaft 376 with the disc rotator 368 results in rotation of the separator discs 378.

The design of the separator shaft 376 can be varied to suit the specific requirements of the separator 14 and the separator assembly 10. In this embodiment, the separator shaft 376 is substantially hollow tube shaped having two different exterior diameters and a common interior diameter. Stated another way, the separator shaft 376 has a primary, larger exterior diameter, a secondary, smaller exterior diameter, and a shaft aperture 376A that extends through the entire length of the separator shaft 376.

The separator discs 378 are positioned substantially uniformly spaced apart from each other along a disc axis 378X and are coupled to the separator shaft 376 via the separator disc mounting ring 380. As provided herein, the discs 378 are spaced apart so that the mixed fluid 26 flows between the discs 378. In one embodiment, the separator discs 378 are physically attached to the separator disc mounting ring 380, which is circular in shape and has been press or shrunk fit over the smaller exterior diameter of the separator shaft 376. In certain embodiments, the separator disc axis 378X substantially coincides with the shaft axis 376X. Stated another way, the separator shaft 376 of the separator discs 378 can be said to extend along the separator disc axis 378X and/or the shaft axis 376X.

As illustrated, the separator discs 378 can each be substantially circle shaped and can each include one or more separator disc apertures 378A. In the embodiment illustrated herein, the separator discs 378 have one separator disc aperture 378A that is substantially centrally located along the surface of the separator disc 378. The separator disc aperture 378A of each of the separator discs 378 is slightly larger than the larger exterior diameter of the separator shaft 376 such that the separator disc aperture 378A encircles the separator shaft 376. Stated another way, the primary, larger exterior diameter of the separator shaft 376 is somewhat less than the inside diameter of the separator disc aperture 378A of each of the separator discs 378. The primary, larger exterior diameter of the separator shaft 376 commences immediately after the separator disc mounting ring 380 and extends up and out the top of the separator chamber 32.

Referring again to the separator chamber 32, the separator chamber 32 further includes the chamber inlet 30 that receives the mixed fluid 26, a first outlet 396A and a second outlet 396B. In some embodiments, the chamber inlet 30 and/or the inlet region 382 of the separator chamber 32 are positioned near the separator shaft 376. In one such embodiment, the chamber inlet 30 and/or the inlet region 382 of the separator chamber 32 encircles the separator shaft 376.

The mixed fluid 26 enters the inlet region 382 of the separator chamber 32 and passes downward through the inlet region 382 toward the chamber aperture 388. The mixed fluid 26 then passes through the chamber aperture 388 into the disc region 384 of the separator chamber 32 along the exterior diameter of the separator shaft 376. While flowing through the disc region 384 of the separator chamber 32 along the exterior diameter of the separator shaft 376, at least a portion of the mixed fluid 26 then flows through the separator disc aperture 378A between the exterior diameter of the separator shaft 376 and the interior diameter of the separator disc aperture 378A.

Additionally, as the disc rotator 368 rotates the plurality of separator discs 378 about the disc axis 378X, a portion of the mixed fluid 26 will continue to flow through the separator disc aperture 378A of each of the separator discs 378, and a portion of the mixed fluid will flow between the spaced apart separator discs 378 across the surface of the separator discs 378 to the interior walls of the disc region 384 of the separator chamber 32. This variation in flow will begin the process of separating the heavier second components 36 (illustrated with squares) from the lighter first components 34 (illustrated with circles). Stated another way, the centrifugal forces induced on this annular flow pattern will begin the process of concentrating or separating the constituent components, i.e. the first components 34 and the second components 36, of the mixed fluid 26. The flow pattern generated by the rotating circular separator discs 378 creates a highly ordered, annular and laminar flow pattern to the mixed fluid 26 as it exits the disc region 384 of the separator chamber 32 and enters the outlet region 386. The friction or molecular adhesion of the mixed fluid 26 to the high speed rotating of the separator discs 378 is the means for drawing the mixed fluid 26 into and moving the mixed fluid 26 out of the separator 14.

As the flow of the mixed fluid 26 continues into the outlet region 386 of the separator chamber 32, a controlled vortex flow pattern is established, which begins to separate the first components 34 and the second components 36 of the mixed fluid 26. During this vortex flow pattern, the lighter first components 34 tend to move toward the center of the outlet region 386 from where they are subsequently moved upward through the shaft aperture 376A of the separator shaft 376 toward the first outlet 396A. Stated another way, the shaft aperture 376A essentially defines the first outlet 396A such that the lighter first components 34 are directed out of the outlet region 386 through the first outlet 396A.

Additionally, during this vortex flow pattern, the heavier second components 36 tend to move and/or stay near the outer edges of the outlet region 386 from where the second components 36 are subsequently directed downward through the second outlet 396B positioned at an outer perimeter, or bottom, of the outlet region 386.

In summary, during operation of the separator 14, the flow of the mixed fluid 26 proceeds as follows: (i) the mixed fluid 26 flows into the separator 14 and the separator chamber 32 through the chamber inlet 30, (ii) the mixed fluid 26 flows through the inlet region 382 of the separator chamber 32, (iii) the mixed fluid 26 flows down the tapered portion of the intermediate floor 382A, (iv) the mixed fluid 26 flows out of the inlet region 382 of the separator chamber 32 between the outside diameter of the chamber aperture 388 and the outside primary diameter of separator shaft 376, (v) the mixed fluid 26 flows out from the separator shaft 376 between the spacing that separates the separator discs 378, (vi) the mixed fluid 26 flows along the interior walls of the disc region 384 of the separator chamber 32, (vii) the mixed fluid 26 flows out of the disc region 384 of the separator chamber 32, (viii) the mixed fluid 26 flows down the interior walls of the outlet region 386 of the separator chamber 32, (ix) the mixed fluid 26 flows about midway down the length of the outlet region 386 of the separator chamber 32 and the mixed fluid 26 splits into an upper outlet stream including the one or more first components 34 and a lower outlet stream including the one or more second components 36, (x) the one or more second components 36 exit through the second outlet 396B at the bottom of the outlet region 386 of the separator chamber 32, and (xi) the one or more first components 34 exit up through the hollow portion, i.e. the shaft aperture 376A, of the separator shaft 376 and through the first outlet 396A.

For example, if the mixed fluid 26 is a slurry of similar density but different size particles, generally the larger particles, i.e. the second components 36, will migrate toward the outside and be closer to the interior wall surfaces of the separator chamber 32. The smaller particles, i.e. the first components 34, will migrate toward the center axis of the outlet region 386 of the separator chamber 32. At the point where the mixed fluid 26 splits into the upper and lower streams, due to the cross section of the outlet region 386 being reduced, the stream of smaller particles will flow up and out of the first outlet 396A and the stream of the larger particles will flow down and out the bottom of the outlet region 386 through the second outlet 396B. A non-exclusive example of this application would be the sorting of mixed sized gravel into different sizes for use as aggregate in concrete Alternatively, if the mixed fluid 26 is a slurry of different density but similar size particles, generally the heavier particles, i.e. the second components 36, will migrate toward the outside and be closer to the interior wall surfaces of the separator chamber 32. The lighter particles, i.e. the first components 34, will migrate toward the center axis of the outlet region 386 of the separator chamber 32. At the point where the mixed fluid 26 splits into the upper and lower streams, due to the cross section of the outlet region 386 being reduced, the stream of lighter particles will flow up and out of the first outlet 396A and the stream of the heavier particles will flow down and out the bottom of the outlet region 386 through the second outlet 396B. A non-exclusive example of this application would be precious mineral mining, since similar size precious mineral particles are usually denser and weigh more than similar size non-precious mineral particles.

Still alternatively, if the mixed fluid 26 is a mix of different viscosity liquids, generally the heavier or more viscous, i.e. the second components 36, will migrate toward the outside and be closer to the interior wall surfaces of the separator chamber 32. The lighter or less viscous fluids, i.e. the first components 34, will migrate toward the center axis of the outlet region 386 of the separator chamber 32. At the point where the mixed fluid 26 splits into the upper and lower streams, due to the cross section of the outlet region 386 being reduced, the stream of lighter or less viscous fluids will flow up and out of the first outlet 396A and the stream of the heavier or more viscous fluids will flow down and out the bottom of the outlet region 386 through the second outlet 396B. A non-exclusive example of this application would be the preprocessing of crude oil, with the heavier and more viscous components of the crude oil such as suspended mineral particles, tars, waxes and asphalts being mechanically separated from the lighter and less viscous oil component before conventional distillation.

Still alternatively, if the mixed fluid 26 is a liquid with a mineral or minerals dissolved in the fluid 26, generally a higher concentration of the dissolved minerals, i.e. the second components 36, will migrate toward the outside and be closer to the interior wall surfaces of the separator chamber 32. The lower concentration of the dissolved minerals, i.e. the first components 34, will migrate toward the center axis of the outlet region 386 of the separator chamber 32. Thereby, a differential or gradient of concentration is created with a higher dissolved mineral concentration at or near the interior wall surfaces and a lower dissolved mineral concentration toward the center axis of the outlet region 386 of the separator chamber 32. At the point where the mixed fluid 26 splits into the upper and lower streams, due to the cross section of the outlet region 386 being reduced, the stream with a lower dissolved mineral concentration will flow up and out of the first outlet 396A and the stream with a higher dissolved mineral concentration will flow down and out the bottom of the outlet region 386 through the second outlet 396B. A non-exclusive example of this application would be the demineralization or desalination of seawater in a cascade of separators 14, with the continued processing of the lower dissolved mineral concentration fluid streams until potable drinking water standards has been achieved.

FIG. 3C is an end section view of the separator 14 illustrated in FIG. 3A with the separator shaft 376, the separator disc mounting ring 380, the separator discs 378, the bearings 390A, 390B and the separator mounting block 370 having been removed.

The separator seals 377A, 377B are adapted to seal the separator shaft 376 to the separator chamber 32 and to the top plate 372. The primary separator seal 377A is positioned adjacent to the separator chamber 32 to seal the separator shaft 376 to the separator chamber 32 and to inhibit any of the mixed fluid 26 (illustrated in FIG. 1A) from leaving the inlet region 382 other than through the chamber aperture 388. The secondary seal 377B is positioned adjacent to the top plate 372 to seal the separator shaft 376 to the top plate 372 and to inhibit any of the fluid from leaking out adjacent to the first outlet 396A.

FIG. 3D is an end section view of the separator shaft 376, the separator disc mounting ring 380 and the separator discs 378 of the separator 14 illustrated in FIG. 3A.

Figure 3E:
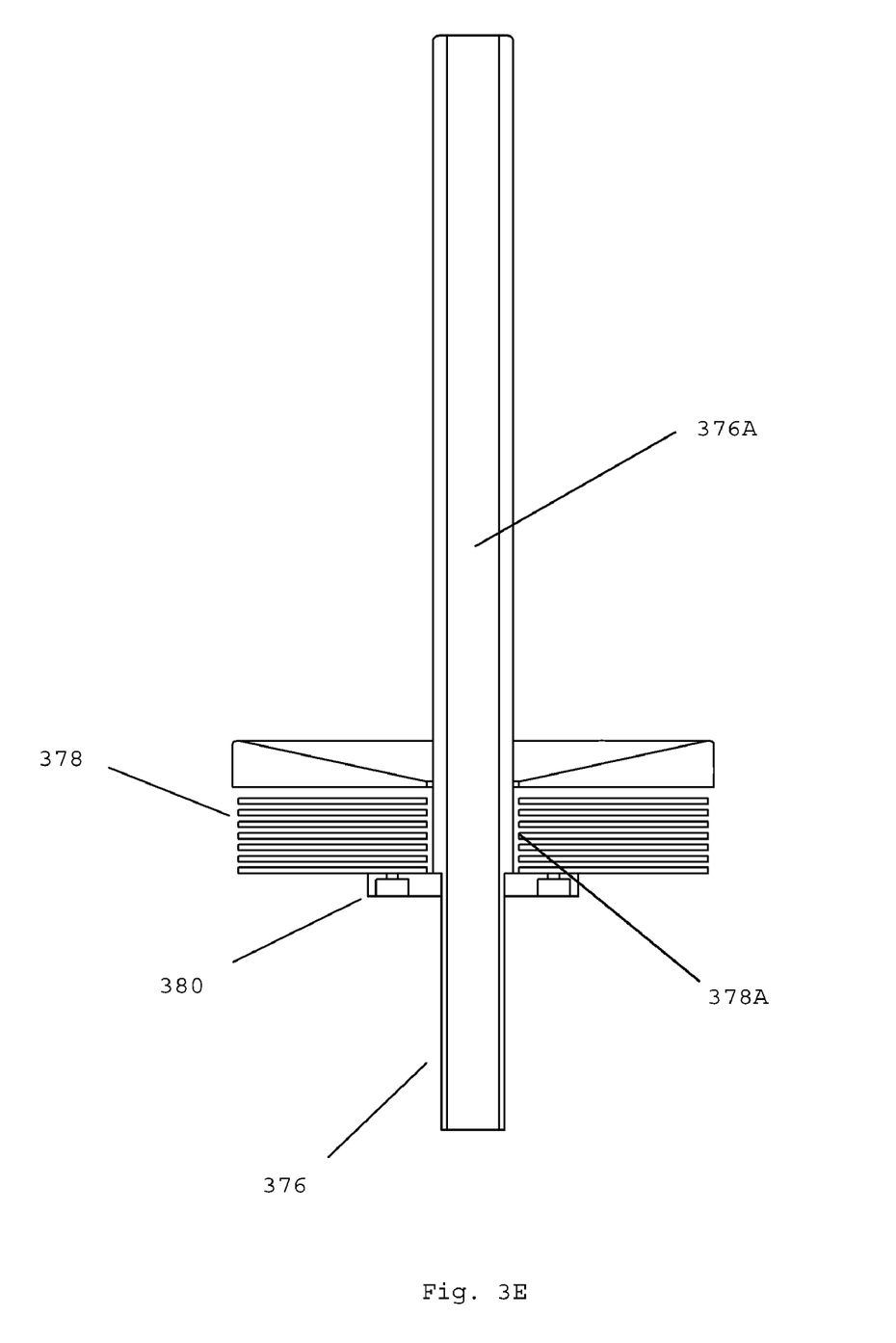
FIG. 3E is a larger scale end section view of the separator shaft, the separator disc mounting ring and the separator discs of the separator illustrated in FIG. 3A.

FIG. 3E is a larger scale end section view of the separator shaft 376, the separator disc mounting ring 380 and the separator discs 378 of the separator 14 illustrated in FIG. 3A. In particular, FIG. 3E more specifically illustrates the relationships between the hollow separator shaft 376 having two different exterior diameters, the separator discs 378 and the separator disc mounting ring 380.

In this embodiment, the separator 14 is illustrated as having seven separator discs 378 that are coupled to the separator shaft 376 via the separator disc mounting ring 380. Alternatively, the separator 14 can be designed to have fewer than seven or greater than seven separator discs 378 that are coupled to the separator shaft 376.

Figure 4:
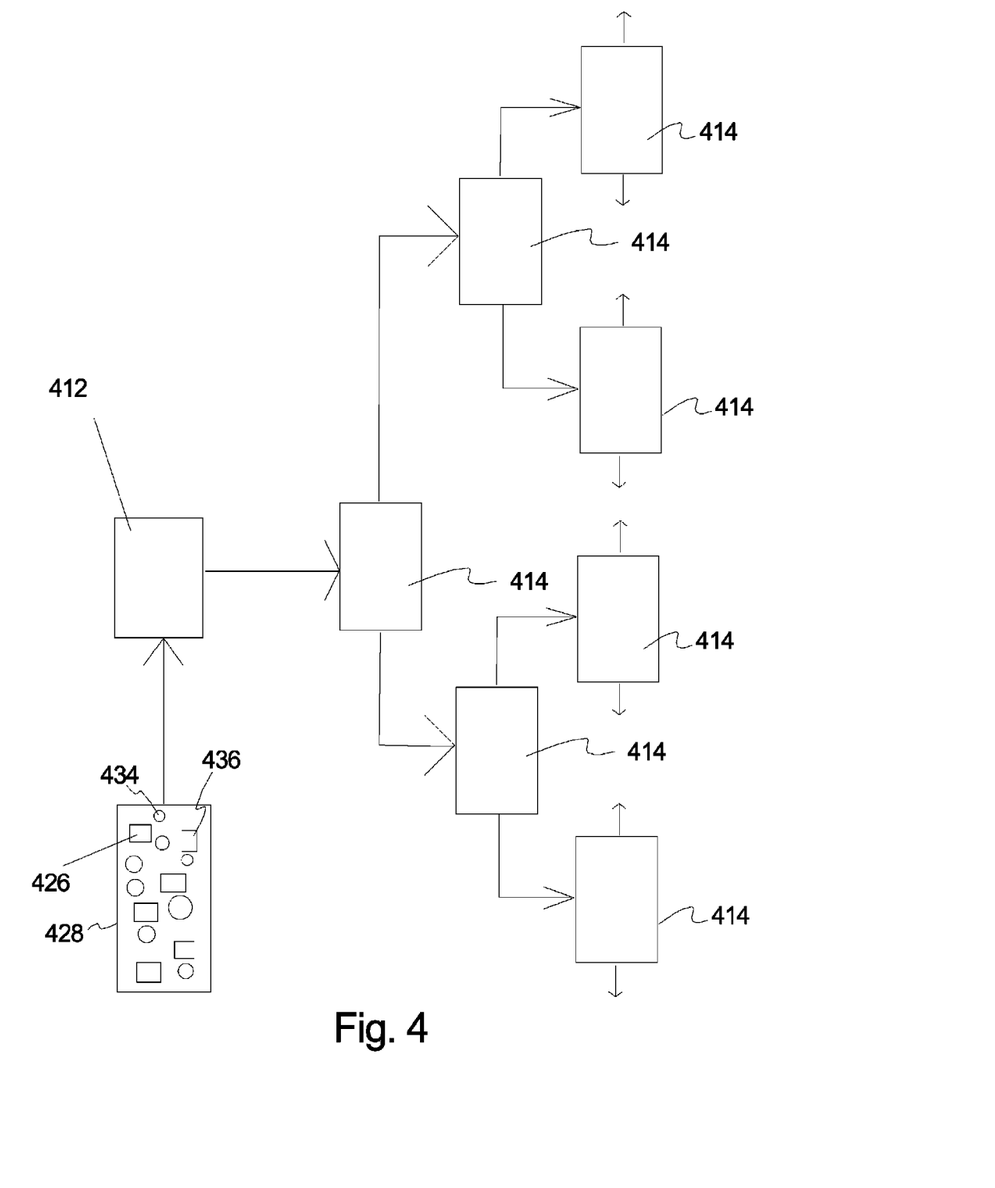
FIG. 4 is a simplified schematic view of another embodiment of a separator assembly having features of the present invention.

FIG. 4 is a simplified schematic view of another embodiment of a separator assembly 410 having features of the present invention. In this embodiment, the separator assembly 410 includes a feed pump 412 and a plurality of separators 414 that are utilized in a series arrangement. As noted above, such an arrangement is commonly referred to as a "hydrocyclone cascade".

With the plurality of separators 414 positioned in a series arrangement, the separator assembly 410 can use subsequent separators 414 to further separate the components into subgroups. For example, in this embodiment, the feed pump 412 supplies the mixed fluid 426 from the fluid source 428 to one of the separators 414. Subsequently, after the first components 434 (illustrated as circles) have been separated from the second components 436 (illustrated as squares) within the first separator 414, the fluid is then directed to one or more additional separators 414 wherein one or both of the first components 434 and the second components 436 can be further separated into first sub-components and second sub-components. Next, one or more separators 414 can be utilized to further separate the sub-components into first sub-sub-components and second sub-sub-components, and so on and so forth.

Alternatively, the separator assembly 410 can also be utilized to do an even more complete and effective job of separating the one or more first components 434 from the one or more second components 436 from within the mixed fluid 426.

While a number of exemplary aspects and embodiments of a separator assembly 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A separator assembly for separating a first component and a second component that is heavier than the first component from within a mixed fluid, the separator assembly comprising:

a separator including (i) a plurality of discs that are spaced apart along a disc axis; (ii) a separator chamber that encircles the plurality of discs, the separator chamber including a chamber inlet that receives the mixed fluid, a first outlet and a second outlet; and (iii) a disc rotator that rotates the plurality of discs about the disc axis so that the mixed fluid entering the separator chamber is spun around the separator chamber about the disc axis to separate the heavier second component from the first component and direct the first component out of the first outlet and the second component out of the second outlet; and a feed pump that supplies the mixed fluid to the separator, the feed pump including a pump shaft and a plurality of spaced apart pump discs that are secured to the pump shaft, and wherein rotation of the pump shaft results in rotation of the pump discs.

2. The separator assembly of claim 1 wherein at least one of the discs includes a disc aperture that is located on the disc axis and wherein chamber inlet is positioned so that at least a portion of the mixed fluid flows through the disc aperture.

3. The separator assembly of claim 2 wherein at least a portion of the mixed fluid flows between the discs and across the surface of the discs.

4. The separator assembly of claim 1 wherein the separator chamber includes a circular tube shaped disc region that encircles the plurality of discs and a tapered tube shaped outlet region that is positioned below the disc region, and wherein the second outlet is positioned near an outer perimeter of the outlet region away from the disc region.

5. The separator assembly of claim 4 wherein the separator chamber further includes an inlet region, wherein the mixed fluid is directed into the inlet region through the chamber inlet, and wherein the mixed fluid flows from the inlet region to the disc region through a chamber aperture.

6. The separator assembly of claim 5 further comprising a shaft that is coupled to the discs and the disc rotator so that rotation of the shaft with the disc rotator results in rotation of the discs, wherein the chamber aperture substantially surrounds the shaft, and wherein the mixed fluid flows through the chamber aperture along the outer surface of the shaft.

7. The separator assembly of claim 5 wherein the inlet region includes an intermediate floor that is tapered from an outside diameter down and toward the chamber aperture.

8. The separator assembly of claim 4 further comprising a shaft that is coupled to the discs and the disc rotator so that rotation of the shaft with the disc rotator results in rotation of the discs, wherein the shaft extends along the disc axis and wherein the shaft includes a shaft aperture that defines the first outlet.

9. The separator assembly of clam 8 wherein the shaft aperture extends along the disc axis into a center of the outlet region.

10. The separator assembly of claim 8 wherein at least one of the discs includes a disc aperture that is located on the disc axis, and wherein the disc aperture encircles the shaft.

11. A separator for separating a first component and a second component within a mixed fluid, the separator comprising:
- at least one disc that is positioned on a disc axis;
- a separator chamber that encircles the at least one disc, the separator chamber including a chamber inlet that receives the mixed fluid, a first outlet and a second outlet; wherein the separator chamber includes a circular tube shaped disc region that encircles the at least one disc and a tapered tube shaped outlet region that is positioned below the disc region, and wherein the second outlet is positioned near an outer perimeter of the outlet region away from the disc region;
- a disc rotator that rotates the at least one disc about the disc axis so that the mixed fluid entering the separator chamber is spun around the separator chamber about the disc axis to separate the second component from the first component and direct the first component out of the first outlet and the second component out of the second outlet;
- a plurality of discs spaced apart along the disc axis, and wherein at least one of the discs includes a disc aperture that is located on the disc axis and wherein chamber inlet is positioned so that at least a portion of the mixed fluid flows through the disc aperture.

12. The separator of claim 11 wherein at least a portion of the mixed fluid flows between the discs and across the surface of the discs.

13. The separator of claim 11 wherein the separator chamber further includes an inlet region, wherein the mixed fluid is directed into the inlet region through the chamber inlet, and wherein the mixed fluid flows from the inlet region to the disc region through a chamber aperture.

14. The separator of claim 13 further comprising a shaft that is coupled to the at least one disc and the disc rotator so that rotation of the shaft with the disc rotator results in rotation of the at least one disc, wherein the chamber aperture substantially surrounds the shaft, and wherein the mixed fluid flows through the chamber aperture along the outer surface of the shaft.

15. The separator of claim 14 wherein the inlet region includes an intermediate floor that is tapered from an outside diameter down and toward the chamber aperture.

* * * * *